United States Patent [19]

Snitzer et al.

[11] Patent Number: 5,351,321
[45] Date of Patent: Sep. 27, 1994

[54] BRAGG GRATING MADE IN OPTICAL WAVEGUIDE

[76] Inventors: Elias Snitzer, 8 Smoke Tree Close, Piscataway, N.J. 08854; John D. Prohaska, P.O. Box 785, Piscataway, N.J. 08855

[21] Appl. No.: 963,839

[22] Filed: Oct. 20, 1992

[51] Int. Cl.$^5$ .............................................. G02B 5/18
[52] U.S. Cl. ........................................ 385/10; 385/37; 385/123; 359/573
[58] Field of Search ...................... 385/10, 37, 8, 123; 359/566, 900, 573

[56] References Cited

U.S. PATENT DOCUMENTS

| | | | |
|---|---|---|---|
| 4,725,110 | 2/1988 | Glenn et al. | 385/100 X |
| 4,874,941 | 10/1989 | Spillman, Jr. | 359/566 X |
| 4,947,413 | 8/1990 | Jewell et al. | 378/34 |
| 5,048,913 | 9/1991 | Glenn et al. | 385/37 |
| 5,061,032 | 10/1991 | Meltz et al. | 385/37 |
| 5,066,133 | 11/1991 | Brienza | 385/37 X |
| 5,104,209 | 4/1992 | Hill et al. | 385/37 X |

FOREIGN PATENT DOCUMENTS 0352975  1/1990  European Pat. Off. .
WO91/12545  8/1991  PCT Int'l Appl. .

OTHER PUBLICATIONS

"Photoinduced grating and intensity dependence of defect generation Ge-doped silica optical fiber", Tsai et al, Appl. Phy. Lett. vol. 6 (4), 27 Jul. '92, pp, 390–392.
"Theory of Fresnel Images I. Plane Periodic Objects in Monochromatic Light", Journal of the Optical Society of America, vol. 55 (4), Winthrop et al, Apr. 1965.

Primary Examiner—Rodney B. Bovernick
Assistant Examiner—Hemang Sanghavi

[57] ABSTRACT

A Bragg grating is made in an optical path composed of material exhibiting change in index when exposed to radiation of an actuating frequency by passing radiation from a source of such actuating frequency through a mask with periodic variation in transmission to expose the material of the path to a diffraction pattern.

18 Claims, 6 Drawing Sheets

RELATIVE INTENSITY b=0.5

AVERAGE INTENSITY

OPEN FRACTION = 0.5

AVERAGE INTENSITY

OPEN FRACTION = 0.33

AVERAGE INTENSITY

OPEN FRACTION = 0.25

RELATIVE INTENSITY

OPEN FRACTION = 0.20

BRAGG GRATING MADE IN OPTICAL WAVEGUIDE

BRIEF SUMMARY OF THE INVENTION

This invention relates to making a Bragg grating in a core of an optical waveguide fiber or other light conducting path. Such grating is useful in effecting reflection of a narrow band of wavelengths of the light passing along the core while wavelengths outside the narrow band pass without reflection.

It is known that certain materials used to make the core of optical waveguide fibers exhibit a modification of index of refraction when exposed to radiation of an actuating frequency. In particular, vitreous silicon dioxide in which is dissolved a few mole percent of germanium dioxide exhibits an increase in index when exposed to radiation of vacuum wavelength 245 nm. It has been discovered that by passing light from a source of the actuation frequency through a mask with periodic variation in transmission, phase, or other optical property a diffraction pattern is formed that can be used to produce a periodic variation in index along the core of an optical waveguide fiber, and thus a Bragg grating.

DETAILED DESCRIPTION

Figure 1:
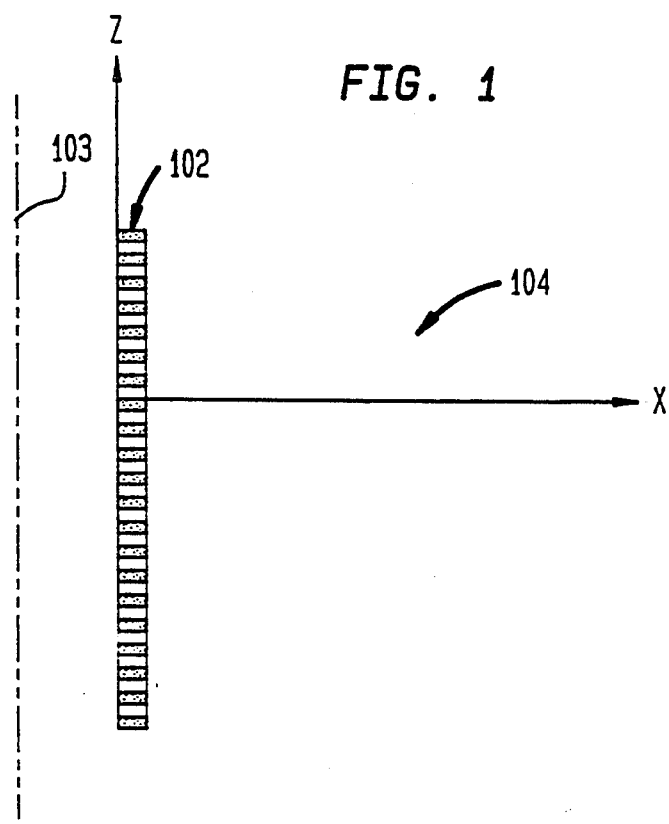
FIG. 1 shows an arrangement of a mask and radiation incident thereon to produce a diffraction pattern as used in the invention.

As shown in FIG. 1, when a mask 102 having periodic variation in transmission with period m in what we designate the z-direction is exposed to light having a planar wave front 103 and propagating in what we designate the x-direction, a diffraction pattern is formed in the region 104 by the light passing through the mask. In the x-z plane the intensity of the diffraction pattern has a periodic variation in both the x- and z-directions, the period in the z-direction being m, and the period in the x-direction being: $px = 2 nm^2/l$, where $l$ is the vacuum wavelength of the radiation and n is the index of refraction in the region of the diffraction pattern.

Figure 2:
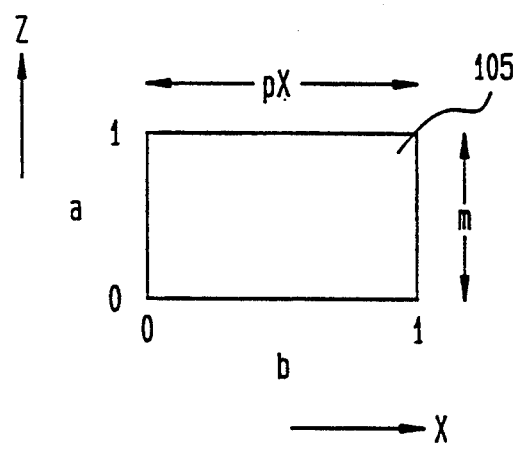
FIG. 2 shows a coordinate system that is convenient for describing the diffraction pattern.
Figure 3:
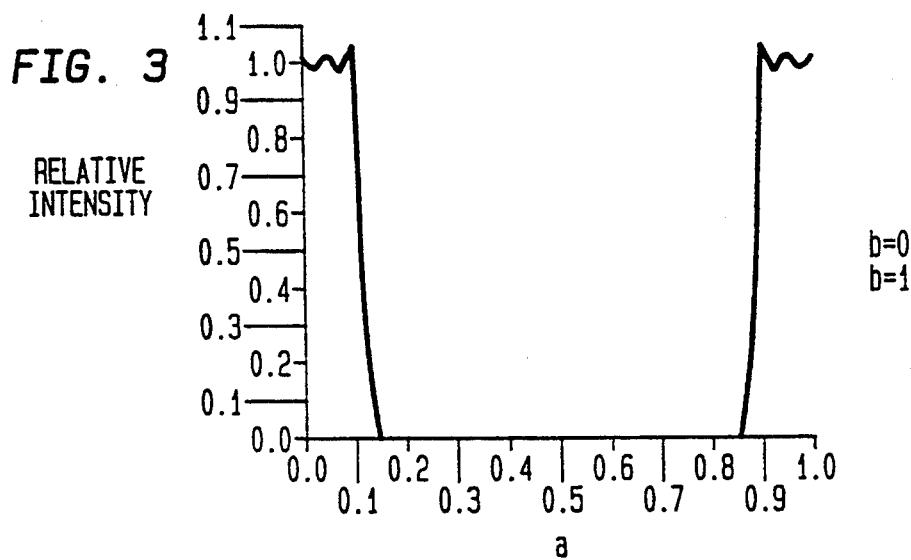
FIGS. 3–9 show the intensity of radiation in the diffraction pattern.
Figure 4:
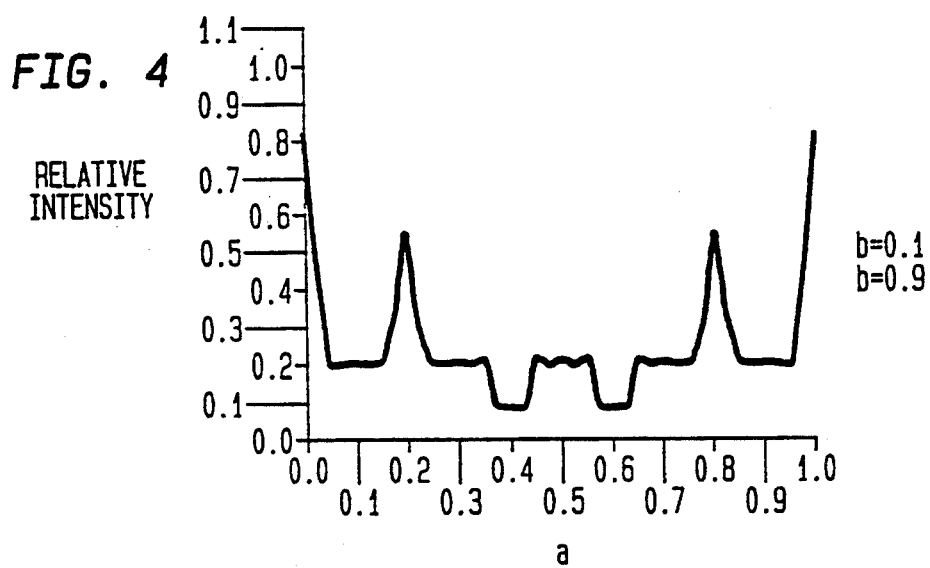
Figure 5:
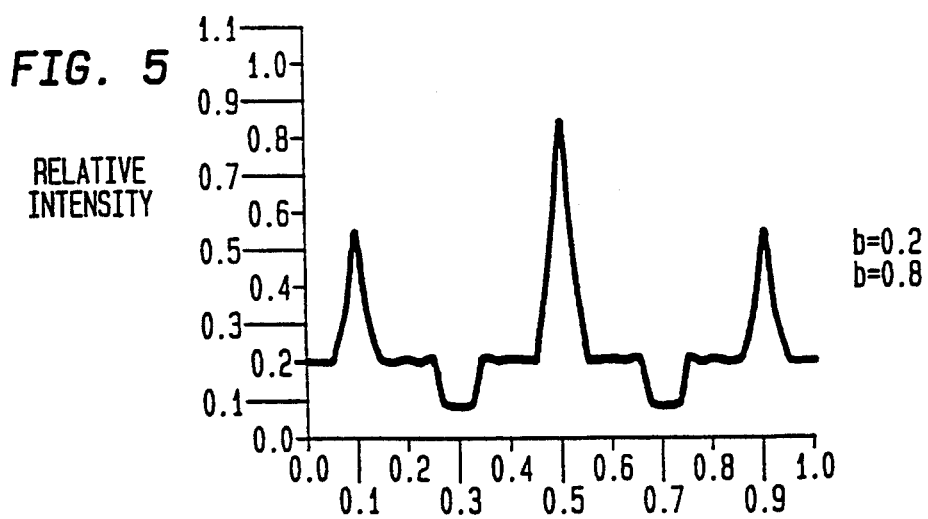
Figure 6:
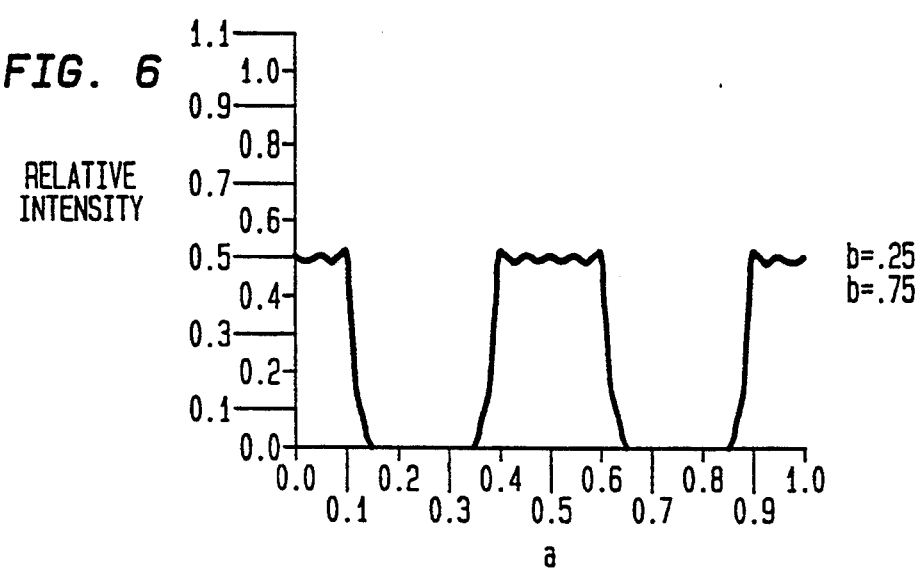
Figure 7:
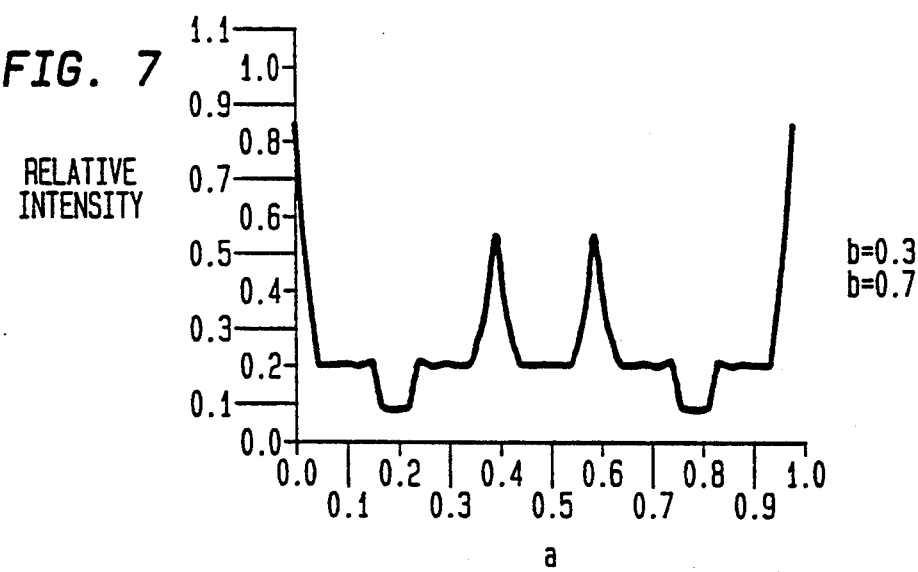
Figure 8:
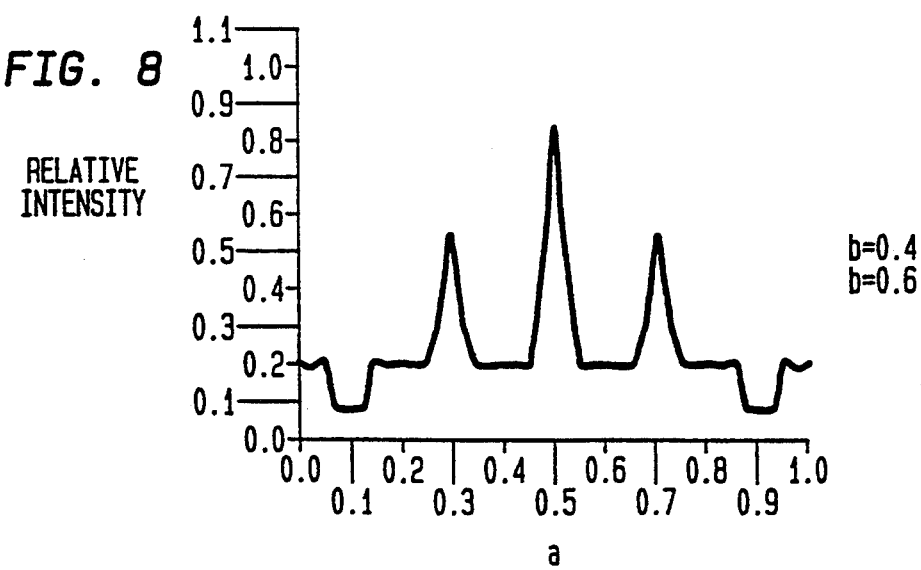
Figure 9:
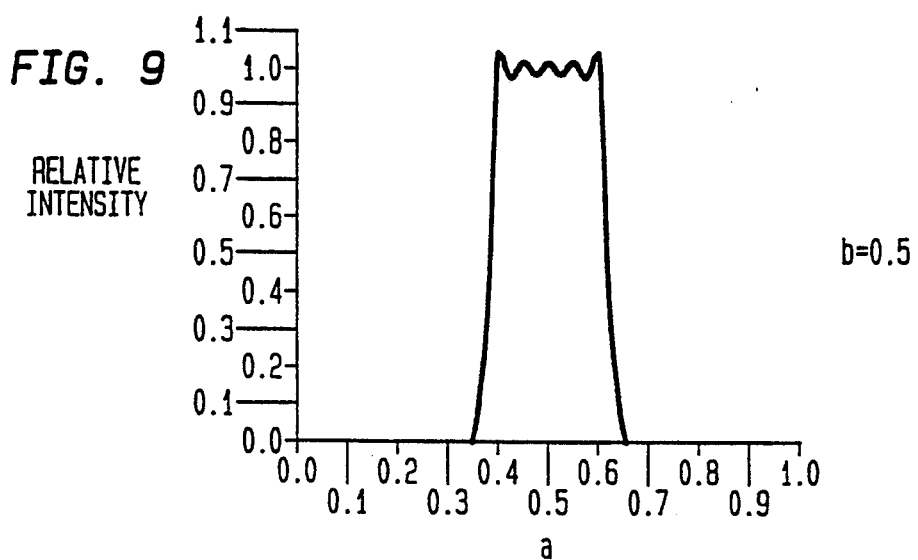
Figure 10:
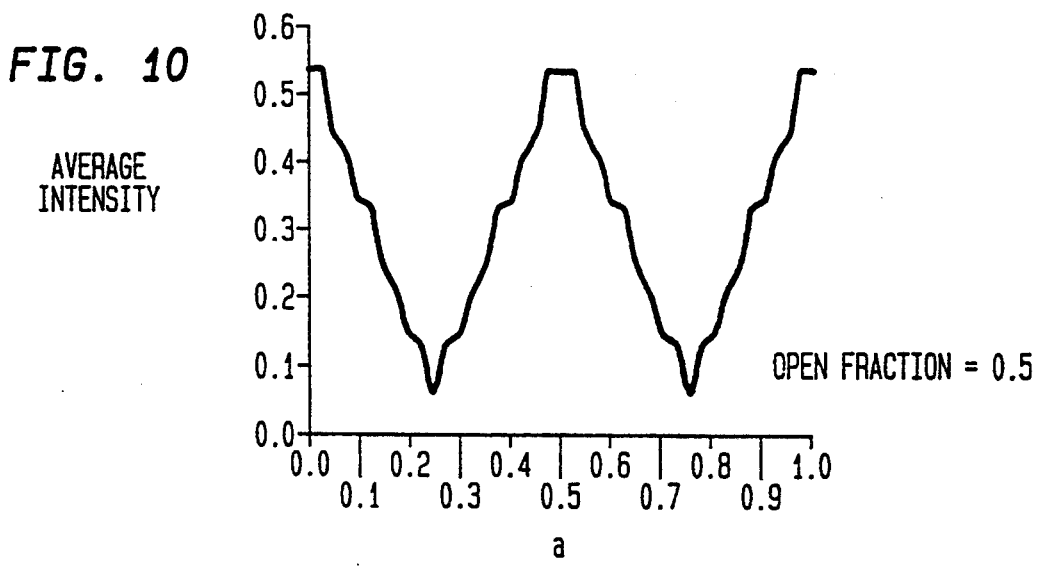
FIGS. 10–13 show the average intensity of the diffraction pattern averaged in the direction of propagation.
Figure 11:
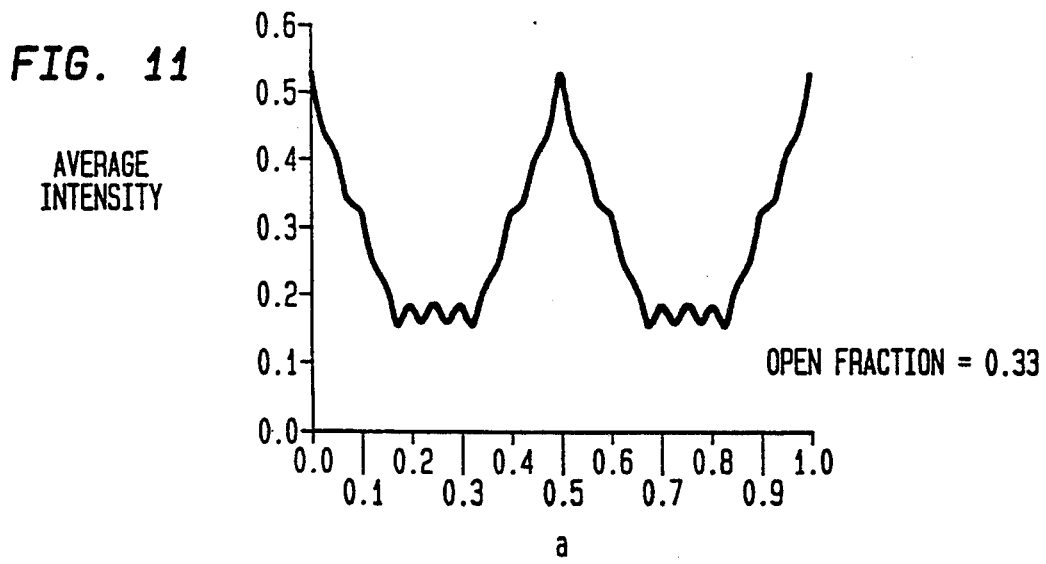
Figure 12:
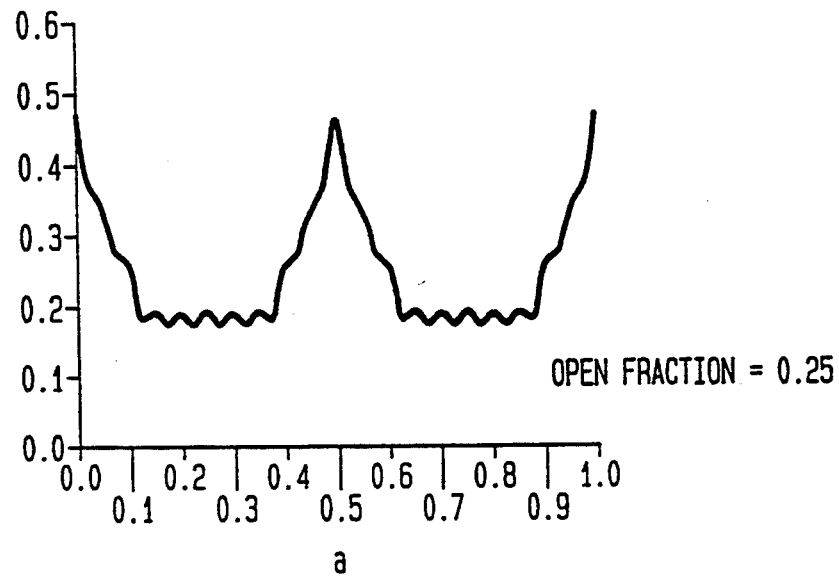
Figure 13:
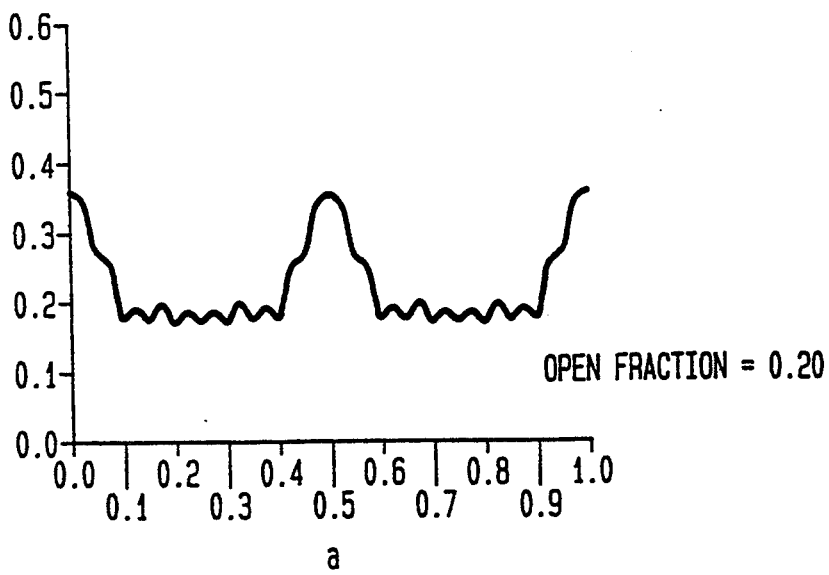

A normalized coordinate system shown in FIG. 2 is convenient for displaying the diffraction pattern within a representative repeat block 105. The coordinate a is parallel to the z-direction and increases from 0 to 1 as z increases by the repeat interval m. The coordinate b is parallel to the x-direction and increases from 0 to 1 as x increases by the repeat period px. FIGS. 3–9 show the relative intensity of the radiation in the diffraction pattern plotted against a for several values of b. Values shown in all of FIGS. 3–9 are for a transmitting fraction of mask equal to 0.25.

If the intensity of the diffraction pattern is integrated in the x-direction over a repeat period, (that is from $b=0$ to $b=1$) one gets the average intensity over a repeat period. The average depends on the value of a and the transmitting fraction of the mask. FIGS. 10–13 show such average intensities plotted against a for several values of the mask transmitting fraction. It may be seen that in all the illustrated instances (and it is true in general) that the average intensity is repeated in the period m so that in fact the average intensity is periodic in the z-direction with a period m/2.

In the foregoing discussion, the wavefront impinging on the mask has been supposed to be planar and to continue directly into the space of the diffraction pattern. In the more general case, curved wavefronts and lenses and mirrors positioned between the mask and the diffraction space can introduce scale magnification factor. In the general case, the quantity m defining the scale of representative repeat block 105 should be interpreted as the repeat period of a projection of the mask (as projected by the radiation incident on the mask according to rules of geometric optics) onto the representative repeat block of interest. For the simple arrangement discussed above, the magnification factor is one and the period of the mask is equal to the period of its projection.

Figure 14:
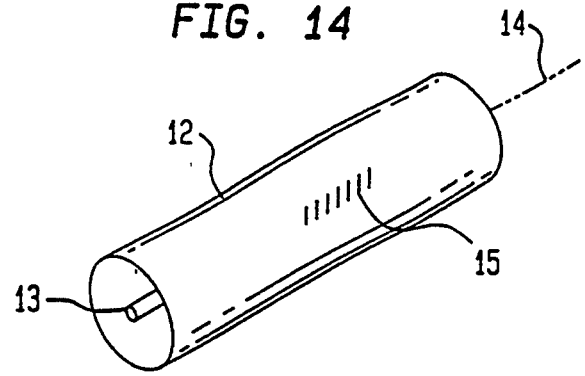
FIG. 14 shows an optical waveguide fiber with a Bragg grating made therein according to the invention.

Turning now to an exemplary embodiment, optical waveguide fiber 12, as shown in FIG. 14, has core 13 running along axis 14 and providing an optical path through the fiber. Core 13 is made of material exhibiting change of index when exposed to radiation of an actuating frequency. An exemplary and advantageous material is vitreous silicon dioxide in which is dissolved a few mole percent of germanium dioxide. Such material experiences a change in index when exposed to radiation of frequency of 1222 terahz. Bragg grating 15 is formed in core 13 by periodic variation in index along core axis 14, according to the invention.

Figure 15:
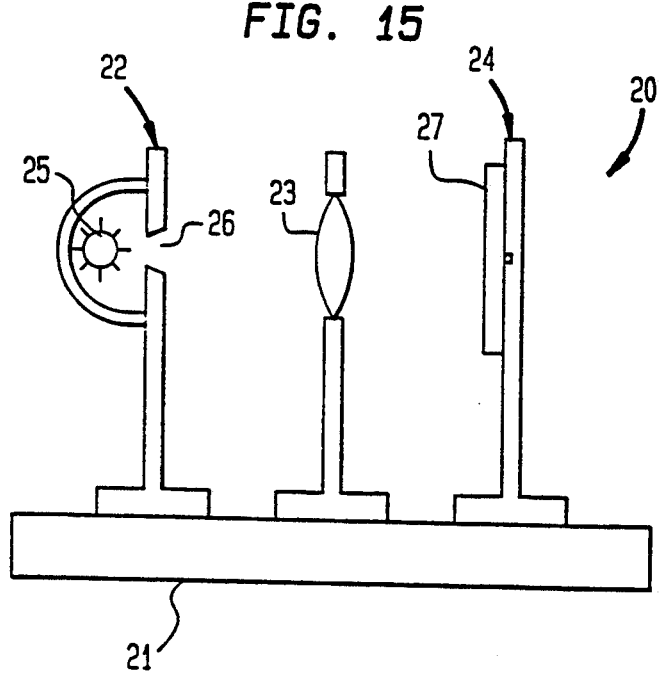
FIG. 15 shows apparatus for making the Bragg grating of FIG. 14.
Figure 16:
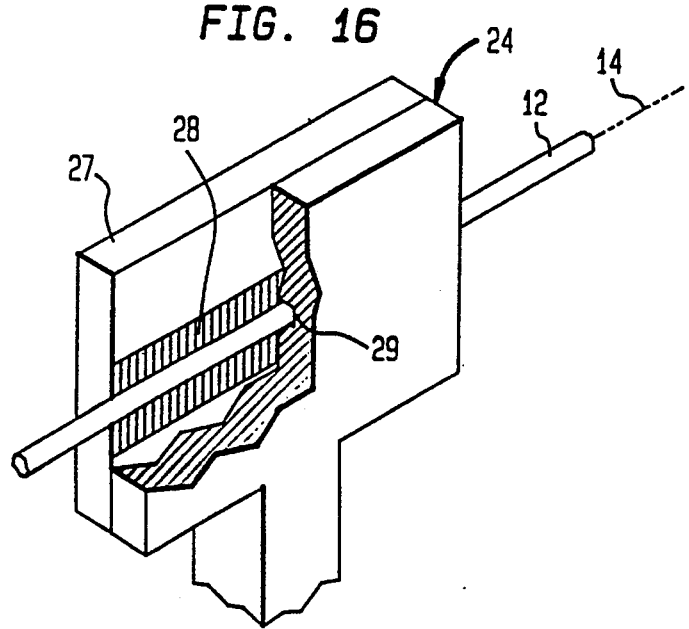
FIG. 16 shows the mask and fiber holder of FIG. 15 in detail and partly cut away.

Apparatus 20 as shown in FIG. 15 is used to make grating 15, according to the invention. Apparatus 20 includes base structure 21 to which is affixed radiation source 22, collimating lens 23, and mask and fiber holder 24. Radiation source 22 includes lamp 25 emitting radiation at the actuating frequency of 1222 terahz supported behind pinhole 26. Holder 24, as shown in more detail in FIG. 16, includes transparent mask support 27 supporting mask 28 which has a periodically repeated variation in transmission in an extended direction perpendicular to the sheet as drawn in FIG. 15. Holder 24 also has a channel 29 which holds fiber 12 in place against mask 28 with the fiber axis 14 running parallel to the extended dimension of the mask. In particular, the period of the variation of the mask transmission is 2 times the desired period in index variation in the Bragg grating.

In operation, a fiber containing a waveguide core made of germanium doped silicon dioxide is introduced into channel 29 and held in position against mask 28. Lamp 25 is actuated and provides a source emanate from pinhole 26. Radiation from pinhole 26 passes through collimating lens 23 where it is formed into a beam with a planar wavefront, which passes through mask support 27 and impinges with uniform wave phase on mask 28. On passing through mask 28 the radiation forms a diffraction pattern as described above. The core 13, which is positioned in the diffraction field is exposed to radiation periodically varying along axis 14, the period being one half that of the mask. Upon exposure to the radiation, the core develops a pattern of index variation along its length corresponding to the variation of radiation exposure. When the exposure of the fiber core to the radiation has proceeded to produce a sensible variation of index, the exposure is terminated and the fiber removed from the apparatus to provide a Bragg grating.

It may be noted that the period of the diffraction pattern in the direction of the light path (the z-direction in FIG. 2) depends on the mask period and any magnification introduced by optical elements but is independent of the wavelength of the activating radiation. Thus in making a grating by the method of the invention, the period of the grating can be made whatever one wishes without any constraint arising from the wavelength of the activating radiation.

A finite bandwidth of the source or a motion of the fiber relative to the mask smears out the diffraction pattern in the x-direction but not in the z-direction.

We claim:

1. A method for making in an optical path in an optical waveguide a Bragg grating with a periodic variation in index, the variation repeating with a period of a desired grating period length, including the steps:
   providing an optical path in an optical waveguide with an extended dimension and being composed of material exhibiting change in index when exposed to radiation of an actuating frequency,
   providing a mask having periodic variation in optical property along one of its dimensions herein denominated the mask periodic dimension, said mask periodic variation having a repeat period of two times said desired grating period length,
   positioning said mask near said optical path with said mask periodic dimension running parallel to said path extended dimension,
   directing radiation of said actuating frequency through said mask so that it produces a radiation diffraction pattern varying in two dimensions and so that it passes into said path,
   maintaining the radiation of the actuating frequency so directed until a sensible variation in the index of said path develops.

2. Method as claimed in claim 1, wherein said radiation of said actuating frequency has a wavefront contacting said mask at uniform phase.

3. Method as claimed in claim 1, wherein said optical path is in a core of an optical waveguide fiber.

4. A method for making in an optical path in an optical waveguide a Bragg grating with a periodic variation in index of a desired grating period length, including the steps:
   providing an optical path in an optical waveguide with an extended dimension and being composed of material exhibiting change in index when exposed to radiation of an actuating frequency,
   providing a radiation path for radiation of said actuating frequency to pass from said source, through said mask, and onto said optical path,
   the mask period being of a size such that a projection of the mask by rays from said source along said radiation path onto the optical path has a periodicity with a period of 2 times said desired grating length,
   directing radiation of said actuating frequency through said mask so that it produces a radiation diffraction pattern varying in two dimensions,
   maintaining the radiation of the actuating frequency so directed until a sensible variation in index of said optical path develops.

5. The method of claim 4 wherein the periodic variation in an optical property comprises a periodic variation in transmissivity.

6. The method of claim 4 wherein the periodic variation in an optical property comprises a periodic variation in phase.

7. Apparatus for making in an optical waveguide having an axis and having core material exhibiting change in index when exposed to radiation of an actuating frequency, a Bragg grating with a periodic variation in index, the variation having a repeat period of a predetermined desired grating length, comprising
   a source of radiation of said actuating frequency,
   a mask having periodic variation in optical property along one of its dimensions,
   structure supporting said waveguide, said source, and said and said mask such that
   radiation emitted from said source passes through said mask so that it produces a radiation diffraction pattern varying in two dimensions and into the core of the waveguide, to form a diffraction pattern in said core having a periodic variation in intensity along the axis with a repeat period equal to said desired grating length.

8. Apparatus as claimed in claim 7, wherein
   the mask variation has a repeat period with length twice that of said desired grating, length,
   said structure holds the waveguide close to the mask with the waveguide axis parallel with said one of the mask dimensions.

9. Apparatus as claimed in claim 7, including a radiation path for radiation of said actuating frequency to pass from said source, through said mask, and into the core of the waveguide, and wherein
   the mask has a repeat period of a size such that a projection of the mask by rays from said source through said radiation path onto the fiber core has a periodicity with a period of 2 times said desired grating length.

10. The apparatus of claim 7 wherein said source of radiation forms a converging wavefront at said mask and said mask has a periodic variation in optical property along one of its dimensions which is more than twice said periodic variation of said Bragg grating.

11. The apparatus of claim 7 wherein said source of radiation forms a diverging wavefront at said mask and said mask has a periodic variation in optical property along one of its dimensions which is less than twice said periodic variation of said Bragg grating.

12. A method for making in an optical waveguide a Bragg grating with a periodic variation in index, the variation repeating with a period of a desired grating length, including the steps:
   providing an optical waveguide with an axis and having a core of material exhibiting change in index when exposed to radiation of an actuating frequency,
   providing a mask having periodic variation in optical property along one of its dimensions,
   directing radiation of said actuating frequency through said mask so that it produces a radiation diffraction pattern varying in two dimensions and into said optical waveguide core so that it produces a diffraction pattern in said core, said diffraction pattern having a periodic variation in intensity along the core axis with a repeat pattern equal to said desired grating length, maintaining the radiation of the actuating frequency so directed until a sensible variation in index of said core develops.

13. An optical waveguide with a core having an axis, said waveguide having a Bragg grating therein, said grating being formed by periodic variation in index along the axis, the variation having a desired repeat length, said waveguide having a core made of material exhibiting change in index when exposed to radiation of an actuating frequency, and said desired repeat length being less than one-half of a wavelength of radiation of said actuating frequency.

14. An optical waveguide with a core having an axis, said waveguide having a Bragg grating therein, said grating being formed by periodic variation in index along the axis, the variation having a desired repeat length, said waveguide having a core made of material exhibiting change in index when exposed to radiation of an actuating frequency, and said desired repeat length being more than 2 times a wavelength of radiation of said actuating frequency.

15. A method for making in an optical path in an optical waveguide a Bragg grating with a periodic variation in index which varies along the length of said optical path, the variation repeating with a period of a desired length and rate of change, including the steps:

providing an optical path in an optical waveguide with an extended dimension and being composed of material exhibiting change of index when exposed to radiation of an actuating frequency;

providing a mask having a variable periodic variation in optical property along one of its dimensions, said mask transmission variation having a variable repeat period of substantially two times said desired length;

positioning said mask near said optical path with said one mask dimension running parallel to said path extended dimension;

directing radiation of said actuating frequency through said mask so that it produces a radiation diffraction pattern varying in two dimensions and so that it passes into said path; and maintaining the radiation of the actuating frequency so directed until a sensible variation in the index of said path develops.

16. Apparatus for making in an optical waveguide having an axis and having core material exhibiting change in index when exposed to radiation of an actuating frequency, a Bragg grating with a variable periodic variation in index, the variation having a variable repeat period of a predetermined desired variable length, comprising:

a source of radiation of said actuating frequency;

a mask having a variable periodic variation in optical property along one of its dimensions;

structure supporting said waveguide, said source, and said mask in a configuration such that radiation emitted from said source passes through said mask so that it produces a radiation diffraction pattern varying in two dimensions and into the core of the waveguide, to form a diffraction pattern in said core having a variable periodic variation in intensity along the axis with a repeat period equal to said desired variable length.

17. A method for making in an optical path in an optical waveguide a Bragg grating with a periodic variation in index across a portion of said optical path, the variation repeating with a period of a desired length, including the steps:

providing an optical path in an optical waveguide with an extended dimension and being composed of material exhibiting change of index when exposed to radiation of an actuating frequency;

providing a mask having a variable periodic variation in optical property along one of its dimensions, said mask transmission variation having a variable repeat period of substantially two times said desired length;

positioning said mask near said optical path with said one mask dimension running parallel to said path extended dimension;

directing highly monochromatic radiation of said actuating frequency through said mask so that it produces a radiation diffraction pattern varying in two dimensions and so that it passes into said path; and maintaining the radiation of the actuating frequency so directed until a sensible variation in the index of said path develops.

18. Apparatus for making in an optical waveguide having an axis and having core material exhibiting change in index when exposed to radiation of an actuating frequency, a Bragg grating with a periodic variation in index across a portion of the optical path in said optical waveguide, the variation having a repeat period of a predetermined desired length, comprising:

a source of highly monochromatic radiation of said actuating frequency;

a mask having periodic variation in optical property along one of its dimensions;

structure supporting said waveguide, said source, and said mask in a configuration such that radiation emitted from said source passes through said mask so that it produces a radiation diffraction pattern varying in two dimensions and into the core of the waveguide, to form a diffraction pattern in said core having a periodic variation in intensity along the axis with a repeat period equal to said desired length.

* * * * *